(12) United States Patent
Imai et al.

(10) Patent No.: US 8,420,187 B2
(45) Date of Patent: Apr. 16, 2013

(54) CELLULOSE ACYLATE COMPOSITION, CELLULOSE ACYLATE FILM, AND ITS APPLICATIONS

(75) Inventors: Tomoko Imai, Kanagawa (JP); Akiko Watano, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 1299 days.

(21) Appl. No.: 12/145,782

(22) Filed: Jun. 25, 2008

(65) Prior Publication Data

US 2009/0002605 A1 Jan. 1, 2009

(30) Foreign Application Priority Data

Jun. 26, 2007 (JP) .................. 2007-167439

(51) Int. Cl.
*C09K 19/00* (2006.01)
*C09K 19/02* (2006.01)
*C09K 19/04* (2006.01)

(52) U.S. Cl.
USPC ................. 428/1.1; 428/1.31; 349/1; 349/75; 349/96; 536/63

(58) Field of Classification Search .................... 428/1.1, 428/1.31; 349/1, 75, 96; 536/63
See application file for complete search history.

(56) References Cited

U.S. PATENT DOCUMENTS

| | | | |
|---|---|---|---|
| 2005/0186360 A1* | 8/2005 | Oya et al. ....................... | 428/1.1 |
| 2007/0275188 A1* | 11/2007 | Sasada ........................... | 428/1.31 |
| 2008/0234461 A1* | 9/2008 | Fukushige .................... | 528/374 |
| 2008/0260972 A1* | 10/2008 | Nozoe et al. ................. | 428/1.31 |

FOREIGN PATENT DOCUMENTS

| | | |
|---|---|---|
| JP | 11-133408 A | 5/1999 |
| JP | 2000-352620 A | 12/2000 |
| JP | 2005-120352 A | 5/2005 |
| JP | 2006-328298 A | 12/2006 |
| SU | 789538 | * 12/1980 |

OTHER PUBLICATIONS

Chinese Office Action corresponding to CN 200810129304, dated Oct. 9, 2011.

* cited by examiner

*Primary Examiner* — James J Seidleck
*Assistant Examiner* — Deve E Valdez
(74) *Attorney, Agent, or Firm* — Sughrue Mion, PLLC

(57) ABSTRACT

A novel cellulose acylate composition is disclosed. The composition comprises at least one cellulose acylate having an aromatic group-containing acyl group (Substituent A), in which a substitution degree with Substituent A satisfies following relational expressions (I) and (II):

$$DSA2+DSA3-DSA6>0.05, \qquad (I)$$

$$0.11<DSA2+DSA3+DSA6<0.71, \qquad (II)$$

wherein DSA2, DSA3 and DSA6 each indicate a substitution degree with Substituent A at the 2-, 3- and 6-positions of the cellulose acylate.

13 Claims, 1 Drawing Sheet

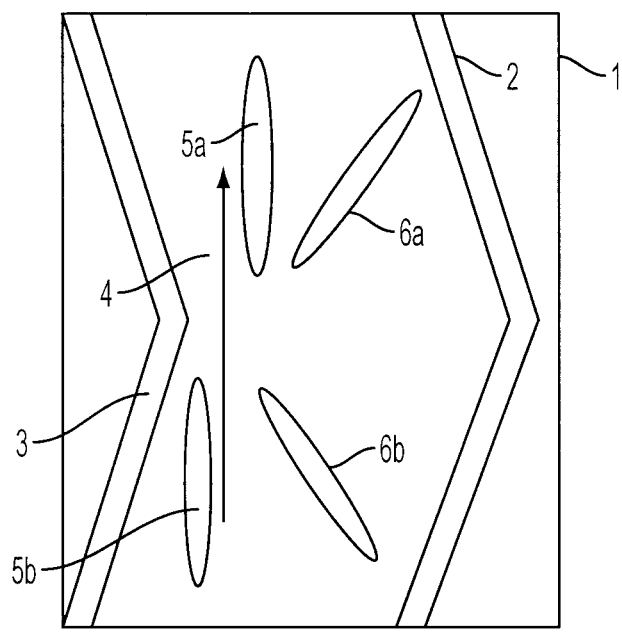

CELLULOSE ACYLATE COMPOSITION, CELLULOSE ACYLATE FILM, AND ITS APPLICATIONS

CROSS-REFERENCE TO RELATED APPLICATIONS

This application claims benefit of priority under 35 U.S.C. 119 to Japanese Patent Application No. 2007-167439, filed on Jun. 26, 2007; and the entire contents of the applications are incorporated herein by reference.

BACKGROUND OF THE INVENTION

1. Field of the Invention

The present invention relates to a cellulose acylate composition, a cellulose acylate film, and their applications.

2. Related Art

Heretofore, cellulose acylate films have been widely utilized as polarizer protective films for liquid-crystal display devices, as having transparency and toughness. For example, proposed are optical films of fatty acid acyl cellulose esters such as cellulose acetate propionate, cellulose acetate butyrate, etc. (see JPA No. 2000-352620). Also proposed are optical films of aromatic acyl-substituted cellulose such as cellulose acetate benzoate (see JPA No. 2006-328298).

However, the optical performance of these films is limited, and for example, films having a negative thickness-direction retardation (Rth) of a large absolute value could not be obtained. Accordingly, these are not satisfactory as retardation films fully applicable to various types of liquid-crystal systems.

For example, in an in-plane switching (IPS) mode where an electric field parallel to the substrates is applied to the liquid crystal, it is proposed to dispose an optical compensatory material having a specific birefringent characteristics, which is prepared by combining a film having a positive birefringence and having an optical axis in the plane of the film and a film having a positive birefringence and having an optical axis in the normal direction of the film, as an optical compensation film, between the liquid-crystal layer and the polarizer, as one method of improving the color tone and the viewing angle aptitude in the black state (see JPA No. hei 11-133408). This optical compensatory method requires a retardation film having a negative thickness-direction retardation of a large absolute value.

In these methods, however, Rth of the film could not be fully reduced; and a method capable of further increasing the absolute value of negative Rth of film is desired. In addition, the cellulose acylate film produced according to the above method has other problems in that its water permeability is large, its water content is high and the humidity dependence of the retardation of the film is great.

SUMMARY OF THE INVENTION

In consideration of the above-mentioned problems, an object of the present invention is to provide a novel cellulose acylate film having a negative thickness-direction retardation (Rth), and to provide a cellulose acylate composition useful for producing such a cellulose acylate film.

Another object of the invention is to provide an optical compensation film, an antireflection film, a polarizer and a liquid-crystal display device produced by the use of the cellulose acylate film.

In one aspect, the present invention provides a cellulose acylate composition comprising at least one cellulose acylate having an aromatic group-containing acyl group (Substituent A), in which a substitution degree with Substituent A satisfies following relational expressions (I) and (II):

$$DSA2+DSA3-DSA6>0.05, \quad (I)$$

$$0.11<DSA2+DSA3+DSA6<0.71, \quad (II)$$

wherein DSA2, DSA3 and DSA6 each indicate a substitution degree with Substituent A at the 2-, 3- and 6-positions of the cellulose acylate.

The cellulose acylate may satisfy following relational expression (III):

$$2.9<DS \leq 3.0 \quad (III)$$

DS indicates a total substitution degree of the cellulose acylate.

The cellulose acylate may further have an aliphatic acyl group (Substituent B).

The substitution degree, DSB, with Substituent B may satisfy following relational expression (IV):

$$2.15 \leq DSB \leq 2.89. \quad (IV)$$

Substituent B may be a $C_{2-4}$ aliphatic acyl group, and may be an acetyl group.

Substituent A may be selected from the group consisting of a benzoyl group, a phenyl benzoyl group, a 4-heptyl benzoyl group, a 2,4,5-trimethoxy benzoyl group and a 3,4,5-trimethoxy benzoyl group.

In another aspect, the present invention provides a cellulose acylate film formed of the composition of the invention; an optical compensation film comprising the cellulose acylate film; an antireflection film comprising the cellulose acylate film; a polarizing plate comprising the cellulose acylate film; and an image display device at least comprising the cellulose acylate film.

BRIEF DESCRIPTION OF THE DRAWINGS

FIG. 1 is a schematic top view showing a part of a pixel area of an IPS mode liquid crystal cell which was produced in Example 2.

In the drawings, the reference numerals have the following meanings.
1 A part of an IPS liquid crystal cell substrate
2 Pixel electrode
3 Displaying electrode
4 Rubbing direction
5a, 5b Director of liquid crystal molecule in a black state
6a, 6b Director of liquid crystal molecule in a white state

PREFERRED EMBODIMENT OF THE INVENTION

The invention is described in detail hereinunder.

In this description, the numerical range expressed by the wording "a number to another number" means the range that falls between the former number indicating the lowermost limit of the range and the latter number indicating the uppermost limit thereof.

1. Cellulose Acylate Composition

The cellulose acylate composition of the invention comprises at least one cellulose acylate having at least an aromatic group-containing acyl group (Substituent A). Cellulose has free hydroxyl groups at the 2-, 3- and 6-positions per the β-1,4-bonding glucose unit thereof. The substitution degree with Substituent A at the 2-, 3- and 6-positions of cellulose is referred to as DSA2, DSA3 and DSA6, respectively, and a cellulose acylate satisfying following relational expressions (I) and (II) is used in the invention.

$$DSA2+DSA3-DSA6>0.05, \quad (I)$$

$$0.11<DSA2+DSA3+DSA6<0.71. \quad (II)$$

The present inventors have assiduously studied and, as a result, have found that, for obtaining negative Rth, a cellulose acylate, having an aromatic group-containing acyl group (Substituent A) existing predominantly at the 2- and 3-positions, is required; and on the basis of this finding, the inventors have further studied and, as a result, have found that, when a cellulose acylate satisfying above relational expressions (I) and (II), then a cellulose acylate film having a large negative Rth can be obtained. For obtaining a film having a larger negative Rth, DSA2+DSA3−DSA6 is more preferably equal to or more than 0.15, even more preferably equal to or more than 0.2. From the same viewpoint, DSA2+DSA3+DSA6 is preferably from 0.2 to 0.71, more preferably from 0.3 to 0.65. Reducing DSA2+DSA3+DSA6 may result in the reduction in the photoelasticity coefficient that will be mentioned hereinunder.

So far as they satisfy above relational expressions (I) and (II), DSA2, DSA3 and DSA6 are not specifically defined in point of their range. Preferably, however, the sum of the substitution degree at the 2- and 3-positions with Substitution A, DSA2+DSA3, is preferably from 0.2 to 0.71, more preferably from 0.25 to 0.71. On the other hand, the substitution degree at the 6-position with Substitution A, DSA6 is preferably smaller in terms of securing negative Rth and of reducing the photoelasticity coefficient, more preferably from 0 to 0.20, even more preferably from 0 to 0.15.

The cellulose acylate may have plural types of aromatic group-containing acyl groups, and regarding any embodiments having plural types thereof, the above-mentioned substitution degree is in terms of the total with the plural groups. For easy production, the cellulose acylate preferably has one type of an aromatic group-containing acyl group.

The total substitution degree with the acyl groups in the cellulose acylate, DS (this includes not only the substitution degree with Substitution A, but also the substitution degree with Substituent B to be mentioned hereinunder) has an influence on the humidity dependence of Rth. In terms of reducing the humidity dependence of Rth, the total substitution degree, DS, of the free hydroxyl group with an acyl group is preferably larger (in this point, the maximum value of the total substitution degree is 3). Concretely, the total substitution degree, DS preferably satisfies following relational expression (III).

$$2.9<DS\leq3.0. \quad (III)$$

DS is more preferably from 2.93 to 3.0.

In the invention, the substitution degree and the distribution of the substitution degree may be determined according to the method described in Cellulose Communication 6, 73-79 (1999), and Chirality 12(9), 670-674, through $^1$H-NMR or $^{13}$C-NMR.

1.-1 Aromatic Group-Containing Acyl Group (Substituent A)

The aromatic group-containing acyl group (substituent A) in the invention may directly bond to the ester-bonding moiety in cellulose, or may bond to it via a linking group. Preferably, it directly bonds to it. The linking group as referred to herein means an alkylene group, an alkenylene group or an alkynylene group, and the linking group may have a substituent. The linking group is preferably a $C_{1-10}$ alkylene group, a $C_{2-10}$ alkenylene group or a $C_{2-10}$ alkynylene group, more preferably a $C_{1-6}$ alkylene group or a $C_{2-6}$ alkenylene group, even more preferably a $C_{1-4}$ alkylene group or a $C_{2-4}$ alkenylene group.

The aromatic group may have at least one substituent. Examples of the substituent of the aromatic group or the above mentioned include alkyls (preferably $C_{1-20}$, more preferably $C_{1-12}$ and even more preferably $C_{1-8}$ alkyls such as methyl, ethyl, propyl, isopropyl, tert-butyl, n-butyl, n-octyl, n-decyl, n-hexadecyl, cyclopropyl, cyclopentyl, and cyclohexyl), alkenyls (preferably $C_{2-20}$, more preferably $C_{2-12}$ and even more preferably $C_{2-8}$ alkenyls such as vinyl, allyl, 2-butenyl and 3-pentenyl), alkynyls (preferably $C_{2-20}$, more preferably $C_{2-12}$ and even more preferably $C_{2-8}$ alkynyls such as propargyl and 3-pentynyl), aryls (preferably $C_{6-30}$, more preferably $C_{6-20}$ and even more preferably $C_{6-12}$ aryls such as phenyl, biphenyl and naphthyl), aminos (preferably $C_{0-20}$, more preferably $C_{0-10}$ and even more preferably $C_{0-6}$ aminos such as methylamino, dimethylamino, diethylamino and dibenzylamino), alkoxys (preferably $C_{1-20}$ more preferably $C_{1-12}$ and even more preferably $C_{1-8}$ alkoxys such as methoxy, ethoxy and butoxy), aryloxys (preferably $C_{6-20}$, more preferably $C_{6-16}$ and even more preferably $C_{6-12}$ aryloxys such as phenyloxy and 2-naphtyloxy), acyls (preferably $C_{1-20}$, more preferably $C_{1-16}$ and even more preferably $C_{1-12}$ acyls such as acetyl, benzoyl, formyl and pivaloyl), alkoxycarbonyls (preferably $C_{2-20}$, more preferably $C_{2-16}$ and even more preferably $C_{2-12}$ alkoxycarbonyls such as methoxycarbonyl and ethoxycarbonyl), aryloxycarbonyls (preferably C7-20, more preferably C7-16 and even more preferably C7-10 aryloxycarbonyls such as phenyloxycarbonyl), acyloxys (preferably $C_{2-20}$, more preferably $C_{2-16}$ and even more preferably $C_{2-10}$ acyloxys such as acetoxy and benzoyloxy), acylaminos (preferably $C_{2-20}$, more preferably $C_{2-16}$ and even more preferably $C_{2-10}$ acylaminos such as acrtylamino and benzoylamino), alkoxycarbonylaminos (preferably $C_{2-20}$, more preferably $C_{2-16}$ and even more preferably $C_{2-12}$ alkoxycarbonylaminos such as methoxycarbonylamino), aryloxycarbonylaminos (preferably $C_{7-20}$, more preferably $C_{7-16}$ and even more preferably $C_{7-12}$ aryloxycarbonylaminos such as phenyloxycarbonylamino), sulfonylaminos (preferably $C_{1-20}$, more preferably $C_{1-16}$ and even more preferably $C_{1-12}$ sulfonylaminos such as methane sulfonylaminos and benzene sulfonylaminos), sulfamoyls (preferably $C_{1-20}$, more preferably $C_{0-16}$ and even more preferably $C_{0-12}$ sulfamoyls such as non-substituted sulfamoyl, methyl sulfamoyl, dimethyl sulfamoyl, and phenyl sulfamoyl), carbamoyls (preferably $C_{1-20}$, more preferably $C_{1-16}$ and even more preferably $C_{1-12}$ carbamoyls such as non-substituted carbamoyl, methyl carbamoyl, diethyl carbamoyl and phenyl carbamoyl), alkylthios (preferably $C_{1-20}$, more preferably $C_{1-16}$ and even more preferably $C_{1-12}$ alkylthios such as methylthio and ethylthio), arylthios (preferably $C_{6-20}$, more preferably $C_{6-16}$ and even more preferably $C_{6-12}$ arylthios such as phenylthio), sulfonyls (preferably $C_{1-20}$, more preferably $C_{1-16}$ and even more preferably $C_{1-12}$ sulfonyls such as mesyl and tosyl), sulfinyls (preferably $C_{1-20}$, more preferably $C_{1-16}$ and even more preferably $C_{1-12}$ sulfinyls such as methane sulfinyl and benzene sulfinyl), ureidos (preferably $C_{1-20}$, more preferably $C_{1-16}$ and even more preferably $C_{1-12}$ ureidos such as non-substituted ureido, methyl ureido and phenyl ureido), amide phosphates (preferably $C_{1-20}$, more preferably $C_{1-16}$ and even more preferably $C_{1-12}$ amide phosphates such as diethyl amide phosphate and phenyl amide phosphate), hydroxy, mercapto, halogen atoms such as fluorine, chlorine, bromine and iodine atoms; cyano, sulfo, carboxyl, nitro, hydroxamic acid group, sulfino, hydrazino, imino, hetero cyclic groups (preferably $C_{1-30}$ and more preferably $C_{1-12}$ hetero cyclic groups, in which at least one hetero atom selected from the group consisting of nitrogen, oxygen and sulfur atoms is embedded, such as imidazolyl, pyridyl, quinolyl, furyl, piperidyl, morpholino, benzoxazolyl, benzoimidazolyl, and benzothiazolyl), and silyls (preferably $C_{3-40}$, more preferably $C_{3-30}$ and even more preferably $C_{3-24}$ silyls such as trimethyl silyl and triphenyl silyl). Such substituents may also have at least one substituent. They may be substituted with two or more types of substituents which may be same with or different from each other.

"Aromatic" is defined as an aromatic compound in Dictionary of Physics and Chemistry (by Iwanami Publishing), 4th ed., p. 1208; and the term "aromatic group" in the description is used for any aromatic hydrocarbon groups and any aromatic heterocyclic groups. The aromatic group is preferably an aromatic hydrocarbon group.

The aromatic hydrocarbon group preferably has from 6 to 24 carbon atoms, more preferably from 6 to 12 carbon atoms, most preferably from 6 to 10 carbon atoms. Specific examples of the aromatic hydrocarbon group include, for example, a phenyl group, a naphthyl group, an anthryl group, a biphenyl group, a terphenyl group; and more preferred is a phenyl group. The aromatic hydrocarbon group is especially preferably a phenyl group, a naphthyl group or a biphenyl group. The aromatic heterocyclic group preferably has at least one of an oxygen atom, a nitrogen atom and a sulfur atom. Specific examples of the heterocyclic group include, for example, those derived from furan, pyrrole, thiophene, imidazole, pyrazole, pyridine, pyrazine, pyridazine, triazole, triazine, indole, indazole, purine, thiazoline, thiadiazole, oxazoline, oxazole, oxadiazole, quinoline, isoquinoline, phthalazine, naphthyridine, quinoxaline, quinazoline, cinnoline, pteridine, acridine, phenanthroline, phenazine, tetrazole, benzimidazole, benzoxazole, benzthiazole, benzotriazole, tetrazaindene. The aromatic heterocyclic group is especially preferably a pyridyl group, a triazinyl group or a quinolyl group.

Examples of the aromatic-group containing acyl group, Substituent A, include phenyl acetyl, hydro cinnamoyl, diphenyl acetyl, phenoxy acetyl, benzoyloxy acetyl, O-acetyl mandelyl, 3-methoxyphenyl acetyl, 4-methoxyphenyl acetyl, 2,5-dimethoxyphenyl acetyl, 3,4-dimethoxyphenyl acetyl, 9-fluorenylmethyl acetyl, cinnamoyl, 4-methoxycinnnamoyl, benzoyl, o-toluoyl, p-toluoyl, m-anisoyl, p-anisoyl, phenyl benzoyl, 4-ethyl benzoyl, 4-propyl benzoyl, 4-t-butyl benzoyl, 4-butyl benzoyl, 4-pentyl benzoyl, 4-hexyl benzoyl, 4-heptyl benzoyl, 4-octyl benzoyl, 4-vinyl benzoyl, 4-ethoxy benzoyl, 4-butoxy benzoyl, 4-hexyloxy benzoyl, 4-heptyloxy benzoyl, 4-pentyloxy benzoyl, 4-octyloxy benzoyl, 4-nonyloxy benzoyl, 4-decyloxy benzoyl, 4-undecyloxy benzoyl, 4-dodecyloxy benzoyl, 4-isopropyloxy benzoyl, 2,3-dimethoxy benzoyl, 2,5-dimethoxy benzoyl, 3,4-dimethoxy benzoyl, 2,6-dimethoxy benzoyl, 2,4-dimethoxy benzoyl, 3,5-dimethoxy benzoyl, 3,4,5-trimethoxy benzoyl, 2,4,5-trimethoxy benzoyl, 1-naphthoyl, 2-naphthoyl, 2-biphenyl carbonyl, 4-biphenyl carbonyl, 4'-ethyl-4-biphenyl carbonyl, 4'-octyloxy-4-biphenylcarbonyl, piperonyloyl, diphenyl acetyl, triphenyl acetyl, phenyl propionyl, α-methyl hydro-cinnamoyl, 2,2-diphenyl propionyl, 3,3-diphenyl, propionyl, 3,3,3-triphenyl propionyl, 2-phenyl butyryl, 3-phenyl butyryl, 4-phenyl butyryl, 5-phenyl butyryl, 3-methyl-2-phenyl valeryl, 6-phenyl hexanoyl, α-methoxy phenyl acetoxy, phenoxy acetyl, 3-phenoxy propionyl, 2-phenoxy propionyl, 11-phenoxy decanoyl, 2-phenoxy butyryl, 2-methoxy acetyl, 3-(2-methoxyphenyl) propionyl, 3-(p-toluoyl) propionyl, (4-methylphenoxy)acetyl, 4-isobutyl-α-methylphenyl acetyl, 4-(4-methoxyphenyl) butyryl, (2,4-di-t-pentyl phenoxy)-acetyl, 4-(2,4-di-t-pentyl phenoxy)-butyryl, (3,4-dimethoxy phenyl) acetyl, 3,4-(methylene dioxy)phenyl acetyl, 3-(3,4-dimethoxy phenyl) propionyl, 4-(3,4-dimethoxyphenyl) butyryl, (2,5-dimethoxyphenyl) acetyl, (3,5-dimethoxy phenyl) acetyl, 3,4,5-trimethoxy phenyl acetyl, 3-(3,4,5-trimethoxy phenyl)-propionyl acetyl, 1-naphthyl acetyl, 2-naphtyl acetyl, α-trimethyl-2-naphthalene-propionyl, (1-naphthoxy) acetyl, (2-naphthoxy) acetyl, 6-methoxy-α-methyl-2-naphthalene acetyl, 9-fluorene acetyl, 1-pyrene acetyl, 1-pyrene butyryl, γ-oxo-pyrene butyryl, styrene acetyl, α-methyl cinnamoyl, α-phenyl cinnamoyl, 2-methyl cinnamoyl, 2-methoxy cinnamoyl, 3-methoxy cinnamoyl, 2,3-dimethoxy cinnamoyl, 2,4-dimethoxy cinnamoyl, 2,5-dimethoxy cinnamoyl, 3,4-dimethoxy cinnamoyl, 3,5-dimethoxy cinnamoyl, 3,4-(methylene dioxy) cinnamoyl, 3,4,5-trimethoxy cinnamoyl, 2,4,5-trimethoxy cinnamoyl, 3-methylidene-2-carbonyl, 4-(2-cyclohexyloxy) benzoyl, 2,3-dimethyl benzoyl, 2,6-dimethyl benzoyl, 2,4-dimethyl benzoyl, 2,5-dimethyl benzoyl, 3-methoxy-4-methyl benzoyl, 3,4-diethoxy benzoyl, α-phenyl-O-toluoyl, 2-phenoxy benzoyl, 2-benzoyl benzoyl, 3-benzoyl benzoyl, 4-benzoyl benzoyl, 2-ethoxy naphthoyl, ethoxy-1-naphthoyl, 9-fluorene carbonyl, 1-fluorene carbonyl, 4-fluorene carbonyl, 9-anthracene carbonyl and 1-pyrene carbonyl.

Among these, preferable examples of Substituent A include phenyl acetyl, hydro-cinnamoyl, diphenyl acetyl, phenoxy acetyl, benzyloxy acetyl, O-acetyl mandelyl, 3-methoxy phenyl acetyl, 4-methoxy phenyl acetyl, 2,5-dimethoxy phenyl acetyl, 3,4-dimethoxy phenyl acetyl, 9-fluorenyl acetyl, cinnamoyl, 4-methoxy-cinnamoyl, benzoyl, o-toluoyl, m-toluoyl, p-toluoyl, m-anisoyl, p-anisoyl, phenyl benzoyl, 4-ethyl benzoyl, 4-propyl benzoyl, 4-t-butyl benzoyl, 4-butyl benzoyl, 4-pentyl benzoyl, 4-hexyl benzoyl, 4-heptyl benzoyl, 4-octyl benzoyl, 4-vinyl benzoyl, 4-ethoxy benzoyl, 4-butoxy benzoyl, 4-hexyloxy benzoyl, 4-heptyloxy benzoyl, 4-pentyloxy benzoyl, 4-octyloxy benzoyl, 4-nonyloxy benzoyl, 4-decyloxy benzoyl, 4-undecyloxy benzoyl, 4-dodecyloxy benzoyl, 4-isopropyloxy benzoyl, 2,3-dimethoxy benzoyl, 2,5-dimethoxy benzoyl, 3,4-dimethoxy benzoyl, 2,6-dimethoxy benzoyl, 2,4-dimethoxy benzoyl, 3,5-dimethoxy benzoyl, 2,4,5-trimethoxy benzoyl, 3,4,5-trimethoxy benzoyl, 1-naphthoyl, 2-naphthoyl, 2-biphenyl carbonyl, 4-biphenyl carbonyl, 4'-ethyl-4-biphenyl carbonyl and 4'-octyloxy-4-biphenyl carbonyl.

Among these, more preferable examples of Substituent A include phenyl acetyl, diphenyl acetyl, phenoxy acetyl, cinnamoyl, 4-methoxy-cinnamoyl, benzoyl, phenyl benzoyl, 4-ethyl benzoyl, 4-propyl benzoyl, 4-t-butyl benzoyl, 4-butyl benzoyl, 4-pentyl benzoyl, 4-hexyl benzoyl, 4-heptyl benzoyl, 3,4-dimethoxy benzoyl, 2,6-dimethoxy benzoyl, 2,4-dimethoxy benzoyl, 3,5-dimethoxy benzoyl, 2,4,5-trimethoxy benzoyl, 3,4,5-trimethoxy benzoyl, 1-naphthoyl, 2-naphthoyl, 2-biphenyl carbonyl and 4-biphenyl carbonyl.

Among these, even more preferable examples of Substituent A include benzoyl, phenyl benzoyl, 4-heptyl benzoyl, 2,4,5-trimethoxy benzoyl and 3,4,5-trimethoxy benzoyl.

The cellulose acylate may have one or more different types of Substitution A.

1.-2 Aliphatic Acyl Group (Substituent B)

The cellulose acylate may additionally have any other acyl group than the aromatic group-containing acyl group (substituent A), concretely, an aliphatic acyl group (Substituent B).

The aliphatic acyl group (substituent B) in the invention may be any of linear, branched or cyclic-structured aliphatic acyl groups, or may be an unsaturated bond-containing aliphatic acyl group. Preferably, it is an aliphatic acyl group having from 2 to 20 carbon atoms, more preferably from 2 to 10 carbon atoms, even more preferably from 2 to 4 carbon atoms. Preferred examples of Substitution B include an acetyl group, an propionyl group and a butyryl group. Above all, more preferred is an acetyl group. Having an acetyl group as Substitution B, the cellulose acylate may form a film having a suitable glass transition point (Tg) and a suitable modulus of elasticity. When having an aliphatic acyl group having a small number of carbon atoms, such as an acetyl group, the film may have a suitable strength, not lowering its Tg and modulus of elasticity.

The substitution degree DSB with Substitution B preferably satisfies following relational expression (IV):

$$2.15 \leq DSB \leq 2.89. \quad (IV)$$

The substitution degree (DSB) with Substitution B is more preferably from 2.15 to 2.80, even more preferably from 2.40 to 2.80. Within the range, the starting material, diacetyl cellulose is favorable as it may have high solubility and its production may be easy.

Examples of the cellulose acylate which can be used in the invention, include, but are not limited to, those shown in the following table.

| No. | Substituent A | DSA2 + DSA3 + DSA6 | DSA2 + DSA3 − DSA6 | Substituent B | DS |
|---|---|---|---|---|---|
| A-1 | benzoyl | 0.65 | 0.65 | acetyl | 3.0 |
| A-2 | benzoyl | 0.65 | 0.4 | acetyl | 3.0 |
| A-3 | benzoyl | 0.49 | 0.35 | acetyl | 3.0 |
| A-4 | benzoyl | 0.49 | 0.35 | acetyl | 2.95 |
| A-5 | benzoyl | 0.49 | 0.35 | acetyl | 2.91 |
| A-6 | 4-heptyl benzoyl | 0.49 | 0.35 | acetyl | 3.0 |
| A-7 | 4-heptyl benzoyl | 0.49 | 0.35 | acetyl | 2.95 |
| A-8 | 4-heptyl benzoyl | 0.49 | 0.35 | acetyl | 2.91 |
| A-9 | 4-heptyloxy benzoyl | 0.49 | 0.35 | acetyl | 3.0 |
| A-10 | 4-heptyloxy benzoyl | 0.49 | 0.35 | acetyl | 2.95 |
| A-11 | 4-heptyloxy benzoyl | 0.49 | 0.35 | acetyl | 2.91 |
| A-12 | 4-hexyl benzoyl | 0.49 | 0.35 | acetyl | 3.0 |
| A-13 | 4-hexyl benzoyl | 0.49 | 0.35 | acetyl | 2.95 |
| A-14 | 4-hexyl benzoyl | 0.49 | 0.35 | acetyl | 2.91 |
| A-15 | 4-hexyloxy benzoyl | 0.49 | 0.35 | acetyl | 3.0 |
| A-16 | 4-hexyloxy benzoyl | 0.49 | 0.35 | acetyl | 2.95 |
| A-17 | 4-hexyloxy benzoyl | 0.49 | 0.35 | acetyl | 2.91 |
| A-18 | 2,4,5-trimethoxy benzoyl | 0.49 | 0.35 | acetyl | 3.0 |
| A-19 | 2,4,5-trimethoxy benzoyl | 0.49 | 0.35 | acetyl | 2.95 |
| A-20 | 2,4,5-trimethoxy benzoyl | 0.49 | 0.35 | acetyl | 2.91 |
| A-21 | 3,4,5-trimethoxy benzoyl | 0.49 | 0.35 | acetyl | 3.0 |
| A-22 | 3,4,5-trimethoxy benzoyl | 0.49 | 0.35 | acetyl | 2.95 |
| A-23 | 3,4,5-trimethoxy benzoyl | 0.49 | 0.35 | acetyl | 2.91 |
| A-24 | 4-petyl benzoyl | 0.49 | 0.35 | acetyl | 3.0 |
| A-25 | 4-butyl benzoyl | 0.49 | 0.35 | acetyl | 3.0 |
| A-26 | 4-t-butyl benzoyl | 0.49 | 0.35 | acetyl | 3.0 |
| A-27 | 2,6-dimethoxy benzoyl | 0.49 | 0.35 | acetyl | 3.0 |
| A-28 | 3,5-dimethoxy benzoyl | 0.49 | 0.35 | acetyl | 3.0 |
| A-29 | Benzoyl | 0.39 | 0.37 | acetyl | 3.0 |
| A-30 | benzoyl | 0.32 | 0.25 | acetyl | 3.0 |
| A-31 | 4-heptyl benzoyl | 0.32 | 0.25 | acetyl | 3.0 |
| A-32 | 4-heptyl benzoyl | 0.32 | 0.25 | acetyl | 2.95 |
| A-33 | 4-heptyl benzoyl | 0.32 | 0.25 | acetyl | 2.91 |
| A-34 | 4-heptyloxy benzoyl | 0.32 | 0.25 | acetyl | 3.0 |
| A-35 | 4-heptyloxy benzoyl | 0.32 | 0.25 | acetyl | 2.95 |
| A-36 | 4-heptyloxy benzoyl | 0.32 | 0.25 | acetyl | 2.91 |
| A-37 | 4-hexyl benzoyl | 0.32 | 0.25 | acetyl | 3.0 |
| A-38 | 4-hexyl benzoyl | 0.32 | 0.25 | acetyl | 2.95 |
| A-39 | 4-hexyl benzoyl | 0.32 | 0.25 | acetyl | 2.91 |
| A-40 | 4-hexyloxy benzoyl | 0.32 | 0.25 | acetyl | 3.0 |
| A-41 | 4-hexyloxy benzoyl | 0.32 | 0.25 | acetyl | 2.95 |
| A-42 | 4-hexyloxy benzoyl | 0.32 | 0.25 | acetyl | 2.91 |
| A-43 | 2,4,5-trimethoxy benzoyl | 0.32 | 0.25 | acetyl | 3.0 |
| A-44 | 2,4,5-trimethoxy benzoyl | 0.32 | 0.25 | acetyl | 2.95 |
| A-45 | 2,4,5-trimethoxy benzoyl | 0.32 | 0.25 | acetyl | 2.91 |
| A-46 | 3,4,5-trimethoxy benzoyl | 0.32 | 0.25 | acetyl | 3.0 |
| A-47 | 3,4,5-trimethoxy benzoyl | 0.32 | 0.25 | acetyl | 2.95 |
| A-48 | 3,4,5-trimethoxy benzoyl | 0.32 | 0.25 | acetyl | 2.91 |
| A-49 | 4-pentyl benzoyl | 0.32 | 0.25 | acetyl | 3.0 |
| A-50 | 4-butyl benzoyl | 0.32 | 0.25 | acetyl | 3.0 |
| A-51 | 4-t-butyl benzoyl | 0.32 | 0.25 | acetyl | 3.0 |
| A-52 | 2,6-dimethoxy benzoyl | 0.32 | 0.25 | acetyl | 3.0 |
| A-53 | 3,5-dimethoxy benzoyl | 0.32 | 0.25 | acetyl | 3.0 |
| A-54 | benzoyl | 0.55 | 0.11 | acetyl | 3.00 |
| A-55 | benzoyl | 0.50 | 0.06 | acetyl | 2.91 |

The cellulose acylate is a cellulose skeleton-having compound that is produced by biologically or chemically introducing at least an aromatic group-containing acyl group (substituent A) into a starting material, cellulose.

For the starting material cotton for cellulose acylate, usable is not only natural cellulose such as cotton linter and wood pulp (broad-leaved tree pulp, coniferous tree pulp), but also cellulose having a low degree of polymerization (degree of polymerization of from 100 to 300) that is obtained through acid hydrolysis of wood pulp, such as microcrystalline cellulose; and as the case may be their mixture may also be used. The details of the starting material cellulose are described, for example, in "Plastic Material Lecture (17), Cellulosic Resin" (written by Marusawa, Uda, published by Nikkan Kogyo Shinbun-sha, 1970); Hatsumei Kyokai Disclosure Bulletin 2001-1745 (pp. 7-8); and "Encyclopedia of Cellulose (p. 523)" (edited by the Society of Cellulose of Japan, published by Asakura Shoten, 2000). Cellulose described in these references can be used herein, to which, however, the invention should not be limited.

Cellulose acylate which can be used in the invention may be prepared, for example, by reacting Aldrich's cellulose acylate (having a degree of acetyl substitution of 2.45) or Daicel's cellulose acetate (having a degree of acetyl substitution of 2.41 (trade name, L-70), or 2.15 (trade name, FL-70), which is a starting material, with a corresponding acid chloride. In general, starting from a cellulose acetate in which the hydroxyl groups are partly substituted with an acetyl group, it may be reacted with an acid chloride such as benzoyl chloride so as to introduce Substitution A thereinto, and Substitution A may be predominantly introduced into the 6-position. For obtaining a cellulose acylate having Substitution A predominantly introduced into the 2- and 3-positions, cellulose acetate is once deacetylated under a basic condition so as to predominantly remove the 2- and 3-positioned acetyl groups, and thereafter it is acylated with an acid chloride, thereby obtaining a cellulose acylate having Substitution A predominantly introduced into the 2- and 3-positions and having the acetyl group remaining essentially at the 6-position as a substituent B. The deacetylation may be attained, for example, in the presence of amine and water. By controlling the degree of acetyl substitution of the starting material cellulose acetate, the condition in deacetylation and the condition for substituent A introduction, a cellulose acylate satisfying the above formulae (I) and (II) may be produced.

Not specifically defined, the viscosity-average degree of polymerization of the cellulose acylate is preferably from 300 to 700, more preferably from 350 to 500, even more preferably from 400 to 500. When the polymer has a mean degree of polymerization of at most 700, then the viscosity of the cellulose acylate dope may not be too high and the film formation with the dope by casting may be easy. When the polymer has a degree of polymerization of at least 300, it is favorable since the intensity of the film formed of it may increase. The mean degree of polymerization may be measured, for example, according to an Uda et al's limiting viscosity method (Kazuo Uda, Hideo Saito; the Journal of the Society of Fiber Science and Technology of Japan, Vol. 18, No. 1, pp. 105-120, 1962). Concretely, it may be measured according to the method described in JPA No. hei 9-95538.

1.-3 Cellulose Acylate Composition

The cellulose acylate composition of the invention will be described below.

The cellulose acylate composition of the invention comprises at least one above-mentioned cellulose acylate.

Preferably, the cellulose acylate composition of the invention comprises the cellulose acylate in an amount of from 70% by mass to 100% by mass of the whole composition, more preferably from 80% by mass to 100% by mass, even more preferably from 90% by mass to 100% by mass.

The cellulose acylate composition of the invention may be in any form of granules, powders, fibers, bulks, solutions or melts.

The starting material for film formation is preferably granular or powdery; and therefore, the cellulose acylate composition after dried may be ground or sieved for unifying the particle size and for improving the handlability thereof.

In the invention, one or more different types of cellulose acylates may be used either singly or as combined. As the case may be, the composition may contain any other polymer component than cellulose acylate and may contain various additives. Preferably, the ingredients to be mixed for the composition are well compatible with cellulose acylate; and preferably, the composition mixed with them may form a film having a transmittance of at least 80%, more preferably at least 90%, even more preferably at least 92%.

In the invention, various additives generally applicable to cellulose acylate (for example, UV inhibitor, plasticizer, antioxidant, fine particles, optical characteristics modulator) may be added to the cellulose acylate to prepare a composition. Regarding the time at which the additives are added to the cellulose acylate, they may be added at any time in the process of dope preparation, or may be added in the final modulation step of the dope preparation process.

2. Cellulose Acylate Film

The invention also relates to a cellulose acylate film.

The cellulose acylate film of the invention is formed of the cellulose acylate composition of the invention.

The cellulose acylate film of the invention preferably contains the above-mentioned cellulose acylate in an amount of at least 50% by mass, more preferably at least 80%, even more preferably at least 95%.

The production method for the cellulose acylate film of the invention is not specifically defined. Preferably, the film is produced according to a melt casting process or a solution casting process to be described below. More preferred is a solution casting process. Both the melt casting process and the solution casting process may produce the cellulose acylate film of the invention like ordinary processes. For example, for melt casting film formation, referred to is JPA No. 2006-348123; and for solution casting film formation, referred to is JPA No. 2006-241433.

2.-1 Solution Casting Film Formation

Preferred embodiments of solution casting film formation for the cellulose acylate film of the invention are described below.

In the solution casting process, a solution of cellulose acylate is first prepared, and then the solution is cast on the surface of a support and formed into a film thereon. The solvent to be used in preparing the cellulose acylate solution is not specifically defined. Preferred solvents are chlorine-containing organic solvents such as dichloromethane, chloroform, 1,2-dichloroethane, tetrachloroethane, and chlorine-free organic solvents. The chlorine-free organic solvents are preferably selected from esters, ketones and ethers having from 3 to 12 carbon atoms. The esters, the ketones and the ethers may have a cyclic structure. Compounds having two or more functional groups of esters, ketones and ethers (i.e., —O—, —CO— and —COO—) are also usable herein as a main solvent; and they may have any other functional group such as an alcoholic hydroxyl group. In case where the main solvent has two or more functional groups, the number of the carbon atoms constituting them may fall within a range of the number of carbon atoms that constitute the compound having any of those functional groups. Examples of the esters having from 3 to 12 carbon atoms are ethyl formate, propyl formate, pentyl formate, methyl acetate, ethyl acetate, pentyl acetate. Examples of the ketones having from 3 to 12 carbon atoms are acetone, methyl ethyl ketone, diethyl ketone, diisobutyl ketone, cyclopentanone, cyclohexanone, methylcyclohexanone. Examples of the ethers having from 3 to 12 carbon atoms are diisopropyl ether, dimethoxymethane, dimethoxyethane, 1,4-dioxane, 1,3-dioxolane, tetrahydrofuran, anisole and phenetole. Examples of the organic solvents having plural functional groups are 2-ethoxyethyl acetate, 2-methoxyethanol, 2-butoxyethanol.

In preparing the cellulose acylate solution, it is desirable that cellulose acylate is dissolved in an organic solvent to a degree of from 10 to 35% by mass, more preferably from 13 to 30% by mass, even more preferably from 15 to 28% by mass. In order to dissolve the cellulose acylate in the organic solvent to prepare a solution having the concentration that falls within the range, for example, employable is a method of dissolving it to have a desired concentration in the dissolution step, or a method of first preparing a low-concentration solution (for example, having a concentration of from 9 to 14% by mass) and then concentrating it into a high-concentration solution in the subsequent concentration step. A part from these, also employable is a method comprising first preparing a high-concentration cellulose acylate solution and then adding various additives thereto to convert it into a low-concentration cellulose acylate solution having a predetermined low concentration.

The cellulose acylate solution, dope, may be prepared according to any dissolution method such as dissolution at room temperature, under cooling or heat, and any combinations thereof. Such methods are described in JPA Nos. hei 5-163301, syo 61-106628, syo 58-127737, hei 9-95544, hei 10-95854, hei 10-45950, 2000-53784, hei 11-322946, hei 11-322947, hei 2-276830, 2000-273239, hei 11-71463, hei 04-259511, 2000-273184, hei 11-323017 and hei 11-302388, and they can be used in the invention. The details of the treatment are described in Hatsumei Kyokai Disclosure Bulletin (No. 2001-1745, published on Mar. 15, 2001 by the Hatsumei Kyokai), p. 22-25. In the process of preparing the cellulose acylate solution, it may be concentrated or filtered. The details of the treatment are described in Hatsumei Kyokai Disclosure Bulletin (No. 2001-1745, published on Mar. 15, 2001 by the Hatsumei Kyokai), p. 25. When the polymer is dissolved at high temperatures, then the dissolving temperature is not lower than the boiling point of the organic solvent used in most cases, and in those cases, the system may be processed under pressure.

2.-2 Example of Method for Producing Cellulose Acylate Film

Regarding the method and the equipment for producing the cellulose acylate film of the invention, any conventional solution casting film formation methods and solution casting film formation devices used for producing conventional cellulose acylate films are usable in the invention. A dope (cellulose acylate solution) prepared in a dissolver (tank) is once stored in a storage tank, in which the dope is degassed to be a final dope. The dope is fed into a pressure die from the dope discharge port of the tank, via a metering pressure gear pump through which a predetermined amount of the dope can be fed with accuracy, for example, based on the controlled revolution thereof, and then the dope is uniformly cast onto the metal support of a casting unit that runs endlessly, via the slit of the pressure die. Then, at a peeling point at which the metal support reaches almost after having traveled round, a semi-dried dope film (this may be referred to as a web) is peeled from the metal support. Clipped at its both ends by clips to keep its cross width as such, the resulting web is dried while being conveyed with a tenter, then transported with rolls in the drying device, and after having thus dried, it is wound up with a winder to a predetermined length. The combination of the tenter and the drying device with rolls may be varied depending on the object of the method. In solution-casting film formation for silver halide photographic materials or functional protective films for electronic displays, additional coating devices may be added to the solution casting film formation device, for surface processing of the films for forming an undercoat layer, an antistatic layer, an antihalation layer and a protective layer thereon. The processing steps are described in detail in Hatsumei Kyokai Disclosure Bulletin (No. 2001-1745, published on Mar. 15, 2001 by the Hatsumei Kyokai), pp. 25-30, as grouped into casting (including co-casting), metal support, drying, peeling, and stretching.

2.-3 Treatment of Cellulose Acylate Film

Stretching:

The cellulose acylate film of the invention, thus produced according to the melt casting process or the solution casting process mentioned above, may be stretched.

During the film formation process, the film may be stretched in an on-line mode, or after the film has been formed, it may be once wound up and then stretched in an off-line mode. Specifically, in the melt casting process, the film formed may be stretched before or after it has been completely cooled.

Preferably, the film is stretched at a temperature falling between Tg and (Tg+50° C.), more preferably between (Tg+1° C.) and (Tg+30° C.), even more preferably between (Tg+2° C.) and (Tg+20° C.). Also preferably, the stretching ratio for the stretching is from 0.1 to 500%, more preferably from 10 to 300%, even more preferably from 30 to 200%. The stretching may be effected in one stage or in multiple stages. The stretching ratio may be obtained according to the following formula:

$$\text{Stretching Ratio}(\%) = 100 \times \{(\text{length after stretching}) - (\text{length before stretching})\}/(\text{length before stretching}).$$

The stretching may be effected in a mode of machine-direction stretching or transverse-direction stretching or their combination. Examples of the machine-direction stretching includes (1) roll stretching (using at least two pairs of nip rolls of which the speed of the roll on the take-out side is kept higher, the film is stretched in the machine direction), (2) edge fixed stretching (both edges of the film are fixed, and the film is stretched by conveying it in the machine direction gradually at an elevated speed in the machine direction). The transverse-direction stretching may be tenter stretching (both edges of the film are held with a chuck, and the film is expanded and stretched in the transverse direction (in the direction perpendicular to the machine direction)). The machine-direction stretching and the transverse-direction stretching may be effected either alone (monoaxial stretching) or may be combined (biaxial stretching). In the biaxial stretching, the machine-direction stretching and the transverse-direction stretching may be effected successively (successive stretching) or simultaneously (simultaneous stretching).

Both in the machine-direction stretching and the transverse-direction stretching, the stretching speed is preferably from 10%/min to 10000%/min, more preferably from 20%/min to 1000%/min, even more preferably from 30%/min to 800%/min. In the multi-stage stretching, the stretching speed is the mean value of the stretching speed in each stage.

After thus stretched in the manner as above, it is desirable that the film is relaxed in the machine direction or in the transverse direction by from 0% to 10%. Further, after thus stretched, it is also desirable that the film is thermally fixed at 150° C. to 250° C. for 1 second to 3 minutes.

After thus stretched, the thickness of the film is preferably from 10 to 300 μm, more preferably from 20 μm to 200 μm, even more preferably from 30 μm to 100 μm.

Preferably, the angle θ formed by the film-traveling direction (machine direction) and the slow axis of Re of the film is nearer to 0°, +90° or −90°. Concretely, in machine-direction stretching, the angle is preferably nearer to 0°, more preferably to 0±3°, even more preferably to 0±2°, still more preferably to 0±1°. In transverse-direction stretching, the angle is preferably 90±3° or −90±3°, more preferably 90±2° or −90±2°, even more preferably 90±1° or −90±1°.

In case where the film has Re owing to the tension applied in the machine direction thereto during the process of casting to peeling the film, its Re may be made to be near to 0 (zero) by stretching the film in the transverse direction with a tenter. In this case, the preferred draw ratio is from 0.1 to 20%, more preferably from 0.5 to 10%, even more preferably from 1 to 5%.

The stretching treatment may be effected during the film formation process; or after the unstretched film is once rolled up, it may be stretched. In the former case, the film may be stretched while it still contains the solvent remaining therein, and the film may be favorably stretched when the remaining solvent content is from 2 to 30% by mass.

The thickness of the dried cellulose acetate film may vary, depending on the use and the object of the film; and preferably, it is within a range of from 5 to 500 μm, more preferably within a range of from 20 to 300 μm, even more preferably within a range of from 30 to 150 μm. For optical use, especially for VA liquid-crystal display devices, the film thickness is preferably from 40 to 110 μm. The film thickness may be controlled to be a desired one, by controlling the solid content of the dope, the slit distance of the spinneret of the die, the extrusion pressure through the die and the speed of the metal support.

The cellulose acylate film of the invention may be formed as a long continuous film. For example, it may be formed as a roll of long continuous film having a width of from 0.5 to 3 m (preferably from 0.6 to 2.5 m, more preferably from 0.8 to 2.2 m) and a length per roll of from 100 to 10000 m (preferably from 500 to 7000 m, more preferably from 1000 to 6000 m). In winding up to a roll, the film is preferably knurled at least on one edge thereof, and the knurling width is preferably from 3 mm to 50 mm, more preferably from 5 mm to 30 mm, and the knurling height is preferably from 0.5 to 500 μm, more preferably from 1 to 200 μm. This may be attained by one-side pressing or both-side pressing.

The above-mentioned, unstretched or stretched cellulose acylate film may be used either alone or as combined with a polarizer; and a liquid-crystal layer or a layer having a controlled refractivity (low-refractivity layer) or a hard coat layer may be provided on it for use herein.

2.-4 Optical Properties of Cellulose Acylate Film

In the description, Re(λ) and Rth(λ) each indicate the in-plane retardation (unit: nm) and the thickness direction retardation (unit: nm) at a wavelength λ. Re(λ) is measured by applying a light having a wavelength of λ nm in the normal line direction of a sample of a film, using KOBRA-21ADH or WR (by Oji Scientific Instruments).

When the film to be tested is represented by an uniaxial or biaxial refractive index ellipsoid, then its Rth(λ) is calculated according to the method mentioned below.

With the in-plane slow axis (determined by KOBRA 21ADH or WR) taken as the inclination axis (rotation axis) of the sample (in case where the sample has no slow axis, the rotation axis of the sample may be in any in-plane direction of the sample), Re (λ) of the sample is measured at 6 points in all thereof, up to +50° relative to the normal line direction of the sample at intervals of 10°, by applying a light having a wavelength of λ nm from the inclined direction of the sample.

With the in-plane slow axis from the normal line direction taken as the rotation axis thereof, when the sample has a zero retardation value at a certain inclination angle, then the symbol of the retardation value of the sample at an inclination angle larger than that inclination angle is changed to a negative one, and then applied to KOBRA 21ADH or WR for computation.

With the slow axis taken as the inclination axis (rotation axis) (in case where the sample has no slow axis, the rotation axis of the sample may be in any in-plane direction of the film), the retardation values of the sample are measured in any inclined two directions; and based on the data and the mean refractive index and the inputted thickness of the sample, Rth may be calculated according to the following formulae (11) and (12):

$$Re(\theta) = \left[ nx - \frac{ny \times nz}{\sqrt{\left\{ ny\sin\left(\sin^{-1}\left(\frac{\sin(-\theta)}{nx}\right)\right)\right\}^2 + \left\{ nz\cos\left(\sin^{-1}\left(\frac{\sin(-\theta)}{nx}\right)\right)\right\}^2}} \right] \times \frac{d}{\cos\left\{\sin^{-1}\left(\frac{\sin(-\theta)}{nx}\right)\right\}} \quad (11)$$

$$Rth = \{(nx + ny)/2 - nz\} \times d \quad (12)$$

wherein Re(θ) means the retardation value of the sample in the direction inclined by an angle θ from the normal line direction; nx means the in-plane refractive index of the sample in the slow axis direction; ny means the in-plane refractive index of the sample in the direction vertical to nx; nz means the refractive index of the sample vertical to nx and ny; and d is a thickness of the sample.

When the sample to be tested can not be represented by a monoaxial or biaxial index ellipsoid, or that is, when the sample does not have an optical axis, then its Rth(λ) may be calculated according to the method mentioned below.

With the in-plane slow axis (determined by KOBRA 21ADH or WR) taken as the inclination axis (rotation axis) of the sample, Re(λ) of the sample is measured at 11 points in all thereof, from −50° to +50° relative to the normal line direction of the sample at intervals of 10°, by applying a light having a wavelength of λ nm from the inclined direction of the sample. Based on the thus-determined retardation data of Re(λ), the mean refractive index and the inputted thickness of the sample, Rth(λ) of the sample is calculated with KOBRA 21ADH or WR.

The mean refractive index may be used values described in catalogs for various types of optical films. When the mean refractive index has not known, it may be measured with Abbe refractometer. The mean refractive index for major optical film is described below: cellulose acetate (1.48), cycloolefin polymer (1.52), polycarbonate (1.59), polymethylmethacrylate (1.49), polystyrene (1.59).

Re and Rth of the cellulose acylate film of the invention may be controlled by controlling the total degree of substitution, the distribution of the degree of substitution at the 2-, 3- and 6-positioned substituents, and the draw ratio in stretching. The cellulose acylate film of the invention contains a cellulose acylate in which the degree of substitution of Substitution A satisfies the above formulae (I) and (II), and therefore has a negative Rth. Concretely, the cellulose acylate film of the invention may have a Rth of from −300 to −10 nm or so; but its Rth is not limited to this range.

For the cellulose acylate film of the invention, used is a cellulose acylate satisfying the above formulae (I) and (II), and satisfying the above formula (III) in point of the total degree of substitution thereof, and therefore, the film may have a negative Rth falling within the above range and the humidity dependence of Rth of the film may be small. Concretely, ΔRth of the film, or that is, the difference between Rth of the film at a wavelength of 590 nm at 25° C. and 80% RH and Rth thereof at a wavelength of 590 nm and at 25° C. and 10% RH is from 10 to 25 nm or so, and the humidity dependence of Rth of the film is small.

The fluctuation of Re(590) of the film in the transverse direction is preferably ±5 nm, more preferably ±3 nm. The fluctuation of Rth(590) of the film in the transverse direction is preferably ±10 nm, more preferably ±5 nm. Also preferably, the fluctuation of Re and Rth of the film in the machine direction is within the range of the fluctuation thereof in the transverse direction.

2.-5 Equilibrium Water Content of Cellulose Acylate Film

The water content of the cellulose acylate film of the invention may be determined as follows: A sample of the film, 7 mm×35 mm is analyzed using a water content meter and a sample drier (Aquacounter AQ-200, LE-20S, both by Hiranuma Sangyo), according to a Curl-Fisher method. The water content (g) is divided by the mass (g) of the sample to obtain the equilibrium water content of the film.

The equilibrium water content of the cellulose acylate film of the invention is preferably from 0 to 3% at 25° C. and 80% RH, more preferably from 0.1 to 2%, even more preferably from 0.3 to 1.5%. The film having an equilibrium water content of more than 3% is unfavorable because, when the film is used as the support of an optical compensation film, the humidity change dependence of the retardation thereof is great and the optical compensatory capability of the film lowers.

2.-6 Haze of Cellulose Acylate Film

Preferably, the haze of the cellulose acylate film, as measured with a haze meter (1001DP Model by Nippon Denshoku), is from 0.1 to 0.8, more preferably from 0.1 to 0.7, even more preferably from 0.1 to 0.60. When the haze of the film is controlled to fall within the range and when the optical compensation film comprising it is incorporated in a liquid-crystal display device, then the device may give high-contrast images.

2.-7 Photoelasticity Coefficient of Cellulose Acylate Film

The cellulose acylate film of the invention is preferably used as a protective film for polarizing plate or as a retardation plate. In case where the film is used as a protective film for polarizing plate or as a retardation plate, then its birefringence (Re, Rth) may vary owing to its expansion through moisture absorption or to its stress through shrinkage. The birefringence change through stress of the film may be determined as the photoelasticity coefficient thereof, and its range is preferably from $5 \times 10^{-7}$ (cm$^2$/kgf) to $30 \times 10^{-7}$ (cm$^2$/kgf), more preferably from $6 \times 10^{-7}$ (cm$^2$/kgf) to $25 \times 10^{-7}$ (cm$^2$/kgf), even more preferably from $7 \times 10^{-7}$ (cm$^2$/kgf) to $20 \times 10^{-7}$ (cm$^2$/kgf),

2.-8 Surface Treatment of Cellulose Acylate Film

The unstretched or stretched cellulose acylate film may be optionally subjected to surface treatment to thereby improve the adhesiveness between the cellulose acylate film and various functional layers (e.g., undercoat layer, back layer) adjacent thereto. The surface treatment is, for example, glow discharge treatment, UV irradiation treatment, corona treatment, flame treatment, or acid or alkali treatment.

3. Retardation Film

The cellulose acylate film of the invention may be used as a retardation film.

Preferably, the cellulose acylate film of the invention is combined with functional layers described in detail in Hatsumei Kyokai Disclosure Bulletin (No. 2001-1745, published on Mar. 15, 2001 by the Hatsumei Kyokai), pp. 32-45. Above all, it is desirable that the film is provided with a polarizing layer (for polarizer), an optical compensatory layer (for optical compensation film) and an antireflection layer (for antireflection film).

4. Optical Compensation Film

The invention also relates to an optical compensation film fabricated by forming, on the cellulose acylate film of the invention, an optically-anisotropic layer of aligned molecules of a liquid-crystal compound. The optical compensation film of the invention may be used for optical compensation in liquid-crystal display devices employing any mode. In particular, it is used for compensation of birefringence to occur in a liquid-crystal cell in the black state. Negative Rth of the cellulose acylate film of the invention and Re and/or Rth of the optically-anisotropic layer formed on the film are utilized for optical compensation.

4.-1 Optically-Anisotropic Layer

Examples of the liquid-crystal molecules for use in forming the optically-anisotropic layer include rod-shaped liquid-crystal molecules and discotic liquid-crystal molecules. The rod-shaped liquid-crystal molecules and the discotic liquid-crystal molecules may be either polymer liquid crystals or low-molecular liquid crystals, and further include those produced through crosslinking of low-molecular liquid crystals and no more exhibiting liquid crystallinity. For example, discotic liquid-crystal molecules may be produced with reference to JPA No. hei 8-50206; and rod-shaped liquid-crystal molecules are with reference to JPA No. 2002-62427.

5. Antireflection Film

The invention also relates to an antireflection film comprising the cellulose acylate film of the invention and an antireflection layer. The antireflection film may be produced according to ordinary production methods, and for example, it may be produced with reference to JPA No. 2006-241433.

6. Polarizing Plate

The invention also relates to a polarizing plate comprising a polarizing film and two protective films sandwiching the polarizing film between them, in which at least one of the two protective films is the cellulose acylate film of the invention. The cellulose acylate film of the invention may be stuck to the polarizing film as a part of the optically-anisotropic layer-having optical compensation film to be stuck thereto or as a part of the antireflection layer-having antireflection film thereto. In case where the polarizing plate has any other layer, it is desirable that the surface of the cellulose acylate film of the invention is stuck to the surface of the polarizing film. For example, the polarizing plate may be fabricated with reference to JPA No. 2006-241433.

6. Image Display Device

The invention also relates to an image display device comprising at least one cellulose acylate film of the invention. In the display device, the cellulose acylate film of the invention serves as a retardation film or as a part of a polarizing plate, an optical compensation film or an antireflection film therein.

6.-1 Liquid-Crystal Display Device

The cellulose acylate film of the invention is favorably employed in a liquid-crystal display device as a retardation film or as a part of a polarizing plate, an optical compensation film or an antireflection film comprising a cellulose acylate film therein. Examples of the liquid-crystal display device include TN-mode, IPS-mode, FLC-mode, AFLC-mode, OCB-mode, STN-mode, ECB-mode, VA-mode and HAN-mode display devices; and preferred is an IPS-mode device. The cellulose acylate film of the invention may be favorably used in any of transmission-type, reflection-type or semi-transmission-type liquid-crystal display devices.

In case where the cellulose acylate film of the invention is used in IPS-mode liquid-crystal display devices, the film is preferably disposed between the liquid-crystal cell and the panel-side polarizing plate or the backlight-side polarizing plate therein. The film may function as a protective film for the panel-side polarizing plate or the backlight-side polarizing plate, and in such a case, the film may be incorporated into a liquid-crystal display device as one member of the polarizing plate therein, and may be disposed between the liquid-crystal cell and the polarizing film in the device. The cellulose acylate film of the invention may be used for optical compensation in an IPS-mode liquid-crystal cell (especially for reducing the color shift in the oblique direction in the black state), the film is preferably combined with a positive A plate.

In the embodiment where the cellulose acylate film is combined with a positive A plate, Rth of the combination is preferably from −40 nm to 40 nm, more preferably from −20 nm to 20 nm. In this embodiment, both the cellulose acylate film and the positive A plate are preferably disposed between the panel-side polarizing film (or backlight-side polarizing film) and the liquid-crystal cell in the device. Any of the cellulose acylate film and the positive A plate may be disposed nearer to the panel-side polarizing film (or the backlight-side polarizing film); or that is, the cellulose acylate film may be disposed nearer to the panel-side polarizing film (or the backlight-side polarizing film), or the positive plate A may be disposed nearer to the panel-side polarizing film (or the backlight-side polarizing film). However, when they are disposed in the former configuration, the in-plane slow axis of the positive A plate shall be in parallel to the absorption axis of the panel-side polarizing film (or the backlight-side polarizing film); and when they are disposed in the latter configuration, the in-plane slow axis of the positive A plate shall be perpendicular to the absorption axis of the panel-side polarizing film (or the backlight-side polarizing film).

In this embodiment, it is desirable that there exists no other retardation layer than the cellulose acylate film and the positive A plate between the panel-side polarizing film or the backlight-side polarizing film and the liquid-crystal cell. Accordingly, for example, in case where the panel-side polarizing plate or the backlight-side polarizing plate has any other polarizing plate protective film than the cellulose acylate film of the positive A plate and the protective film is disposed between the liquid-crystal cell and the panel-side polarizing film or the backlight-side polarizing film, then the an isotropic polymer film having Re and Rth of both almost 0 (zero) is preferably used for the protective film; and as the polymer film of the type, preferably used is the cellulose acylate film described in JPA No. 2006-030937.

EXAMPLES

The invention is described more concretely with reference to the following Examples. In the following Examples, the amount and the ratio of the material, the reagent and the substance used, and the operation may be suitably modified or changed not overstepping the sprit and the scope of the invention. Accordingly, the scope of the invention should not be limited to the following Examples.

1. Production Examples

1.-1 Production Example 1

Production of Intermediate Compound C-1

200 g of acetyl cellulose having a degree of substitution of 2.93, 2000 mL of pyridine and 100 mg of 4-dimethylaminopyridine (Wako Pure Chemical) were taken into a 5-L three-neck flask equipped with a mechanical stirrer, a thermometer, a condenser tube and a dropping funnel, and stirred at room temperature. 2000 mL of acetic anhydride was gradually and dropwise added to it, and after the addition, this was further stirred at 70° C. for 5 hours. After the reaction, this was left cooled to room temperature, and the reaction solution was poured into 10 L of methanol with vigorously stirring, whereupon a white solid deposited. The white solid was taken out through suction filtration, and washed three times with a large quantity of methanol. The obtained white solid was dried overnight at 60° C., and dried in vacuum at 90° C. for 6 hours to give 210 g of the intended intermediate compound C-1 as a white powder.

1.-2 Production Example 2

Production of Intermediate Compound C-2

100 g of the intermediate compound C-1 obtained in the previous reaction, 2000 mL of dimethyl sulfoxide and 40 mL of water were taken into a 5 L three-neck flask equipped with a mechanical stirrer, a thermometer, a condenser tube and a dropping funnel, and stirred at 60° C. for 30 hours. After the reaction, this was left cooled to room temperature, and the reaction solution was poured into 10 L of methanol with vigorously stirring, whereupon a white solid deposited. The white solid was taken out through suction filtration, and washed three times with a large quantity of methanol. The obtained white solid was dried overnight at 60° C., and dried in vacuum at 90° C. for 6 hours to give 80 g of the intended intermediate compound C-2 as a white powder.

1.-3 Production Example 3

Production of Compound A-1

40 g of the intermediate compound C-2 obtained in the previous reaction and 400 mL of pyridine were taken into a 3 L three-neck flask equipped with a mechanical stirrer, a thermometer, a condenser tube and a dropping funnel, and stirred at room temperature. 85 mL of benzoyl chloride was gradually and dropwise added to it, and after the addition, this was further stirred at 70° C. for 5 hours. After the reaction, this was left cooled to room temperature, and the reaction solution was poured into 10 L of methanol with vigorously stirring, whereupon a white solid deposited. The white solid was taken out through suction filtration, and washed three times with a large quantity of methanol. The obtained white solid was dried overnight at 60° C., and dried in vacuum at 90° C. for 6 hours to give 45 g of the intended compound A-1 as a white powder. The mean degree of polymerization of the compound was 316.

1.-4 Production Example 4

Production of Intermediate Compound C-3

182 g of the intended intermediate compound C-3 was obtained as a white powder in the same manner as that in production of the previous intermediate compound C-2, for which, however, 100 g of the intermediate compound C-1 was changed to 200 g of acetyl cellulose having a degree of substitution of 2.93, the amount of dimethyl sulfoxide was changed from 2000 mL to 4000 mL, the amount of water was changed from 40 mL to 80 mL, and the stirring time was changed from 30 hours to 20 hours.

1.-5 Production Example 5

Production of Compound A-3

42 g of the intended compound A-3 was obtained as a white powder in the same manner as that in production of the previous compound A-1, for which, however, the intermediate compound C-2 was changed to C-3. The mean degree of polymerization of the compound was 314.

1.-6 Production Example 6

Production of Compound A-5

42 g of the intended compound A-5 was obtained as a white powder in the same manner as that in production of the previous compound A-1, for which, however, the intermediate compound C-2 was changed to C-3 and the amount of benzoyl chloride was changed from 85 mL to 50 mL. The mean degree of polymerization of the compound was 314.

1.-7 Production Example 7

Production of Compound A-6

45 g of the intended compound A-6 was obtained as a white powder in the same manner as that in production of the previous compound A-1, for which, however, the intermediate compound C-2 was changed to C-3 and 85 mL of benzoyl chloride was changed to 190 mL of 4-heptylbenzoyl chloride (Aldrich). The mean degree of polymerization of the compound was 315.

1.-8 Production Example 8

Production of Compound A-9

47 g of the intended compound A-9 was obtained as a white powder in the same manner as that in production of the previous compound A-1, for which, however, the intermediate compound C-2 was changed to C-3 and 85 mL of benzoyl chloride was changed to 190 mL of 4-heptyloxybenzoyl chloride (Aldrich). The mean degree of polymerization of the compound was 313.

1.-9 Production Example 9

Production of Compound A-12

45 g of the intended compound A-12 was obtained as a white powder in the same manner as that in production of the previous compound A-1, for which, however, the intermediate compound C-2 was changed to C-3 and 85 mL of benzoyl chloride was changed to 190 mL of 4-hexylbenzoyl chloride (Aldrich). The mean degree of polymerization of the compound was 315.

1.-10 Production Example 10

Production of Compound A-15

45 g of the intended compound A-15 was obtained as a white powder in the same manner as that in production of the previous compound A-1, for which, however, the intermediate compound C-2 was changed to C-3 and 85 mL of benzoyl chloride was changed to 190 mL of 4-hexyloxybenzoyl chloride (Aldrich). The mean degree of polymerization of the compound was 312.

1.-11 Production Example 11

Production of Compound A-18

47 g of the intended compound A-18 was obtained as a white powder in the same manner as that in production of the previous compound A-1, for which, however, the intermediate compound C-2 was changed to C-3 and 85 mL of benzoyl chloride was changed to 190 mL of 2,4,5-trimethoxybenzoyl chloride (Aldrich). The mean degree of polymerization of the compound was 317.

1.-12 Production Example 12

Production of Compound A-21

46 g of the intended compound A-21 was obtained as a white powder in the same manner as that in production of the previous compound A-1, for which, however, the intermediate compound C-2 was changed to C-3 and 85 mL of benzoyl chloride was changed to 190 mL of 3,4,5-trimethoxybenzoyl chloride (Aldrich). The mean degree of polymerization of the compound was 315.

1.-13 Production Example 13

Production of Intermediate Compound C-4

200 g of diacetyl cellulose (degree of acetyl substitution, 2.15) was dissolved in 1500 mL of tetrahydrofuran. 301 mL of pyridine and 885 g of triphenylmethyl chloride were added to it, and stirred at 70° C. for 11 hours. 300 mL of methanol was added, and after the termination of the heat generation was confirmed, this was mixed with 7000 mL of methanol thereby precipitating the polymer. This was purified by continuous stirring with methanol at 40 to 50° C., thereby giving 216 g of the intended intermediate compound C-4.

1.-14 Production Example 14

Production of Intermediate Compound C-5

90 g of the intended intermediate compound C-5 was obtained as a white powder in the same manner as that in production of the previous compound A-1, for which, however, 40 g of the intermediate compound C-2 was changed to 80 g of C-4, the amount of pyridine was changed from 400 mL to 800 mL and the amount of benzoyl chloride was changed from 85 mL to 170 mL.

1.-15 Production Example 15

Production of Intermediate Compound C-6

90 g of the intermediate compound C-6 was dissolved in 500 g of dichloromethane, and 31 g of a solution of 25% hydrobromic acid/acetic acid was added to it. This was stirred at room temperature for 5 minutes, and 10 g of triethylamine dissolved in 70 g of methanol was added to it, and further stirred for 20 minutes. This was mixed with methanol to precipitate the polymer, then continuously washed with methanol at 40 to 50° C., and filtered and then dried in vacuum to obtain 38 g of the intended intermediate compound C-6. The mean degree of polymerization of the compound was 315.

1.-16 Production Example 16

Production of Compound A-29

42 g of the intended compound A-29 was obtained as a white powder in the same manner as that in production of the previous intermediate compound C-1, for which, however, 40 g of acetyl cellulose having a degree of substitution of 2.93 was changed to the intermediate compound C-6, the amount of acetic anhydride was changed from 2000 mL to 400 mL, and 2000 mL of pyridine was changed to 400 mL of pyridine and 400 mL of dichloromethane. The mean degree of polymerization of the compound was 316.

1.-17 Production Example 17

Production of Intermediate Compound C-7

192 g of the intended intermediate compound C-7 was obtained as a white powder in the same manner as that in production of the previous intermediate compound C-2, for which, however, 100 g of the intermediate compound C-1 was changed to 200 g of acetyl cellulose having a degree of substitution of 2.93, the amount of dimethyl sulfoxide was changed from 2000 mL to 4000 mL, the amount of water was changed from 40 mL to 80 mL and the stirring time was changed from 30 hours to 10 hours.

1.-18 Production Example 18

Production of Compound A-30

42 g of the intended compound A-30 was obtained as a white powder in the same manner as that in production of the previous compound A-1, for which, however, the intermediate compound C-2 was changed to C-7. The mean degree of polymerization of the compound was 314.

1.-19 Production Example 19

Production of Intermediate Compound C-8

41 g of the intended intermediate compound C-8 was obtained as a white powder in the same manner as that in production of the previous compound A-1, for which, however, the intermediate compound C-2 was changed to C-3 and the amount of benzoyl chloride was changed from 85 mL to 15 mL. The mean degree of polymerization of the compound was 315.

1.-20 Production Example 20

Production of Compound A-54

40 g of acetyl cellulose having a degree of substitution of 2.45 and 400 mL of pyridine were taken into a 3 L three-neck flask equipped with a mechanical stirrer, a thermometer, a condenser tube and a dropping funnel, and stirred at room temperature. 85 mL of benzoyl chloride was gradually and dropwise added to it, and after the reaction, this was further stirred at 70° C. for 5 hours. After the reaction, this was left cooled to room temperature, and the reaction solution was poured into 10 L of methanol with vigorously stirring, whereupon a white solid deposited. The white solid was taken out through suction filtration, and washed three times with a large quantity of methanol. The obtained white solid was dried overnight at 60° C., and dried in vacuum at 90° C. for 6 hours to give 45 g of the intended compound A-54 as a white powder. The mean degree of polymerization of the compound was 312.

1.-21 Production Example 21

Production of Compound A-55

43 g of the intended compound A-55 was obtained as a white powder in the same manner as that in production of the previous compound A-1, for which, however, the intermediate compound C-2 was changed to acyl cellulose having a degree of substitution of 2.45, and the amount of benzoyl chloride was changed from 85 mL to 50 mL. The mean degree of polymerization of the compound was 314.

1.-22 Production Example 22

Production of Comparative Compound B-1

This was produced according to the method described in JPA No. 2006-328298. 100 g of cellulose and 100 mL of water were taken unto a 5 L three-neck flask equipped with a mechanical stirrer, and stirred overnight, and water was removed through reduced-pressure filtration. 400 mL of methanol (Wako Pure Chemical) was added to the obtained slurry, and stirred at room temperature for 1 hour, and then filtered under reduced pressure. This operation was repeated twice. 400 mL of dimethylacetamide (Wako Pure Chemical) was added to the obtained slurry, and stirred at room temperature for 1 hour, and then filtered under reduced pressure. This operation was repeated three times, thereby obtaining an activated cellulose. 1000 mL of dimethylacetamide and lithium chloride (Wako Pure Chemical) were taken into a 5 L three-neck flask equipped with a mechanical stirrer, a thermometer, a condenser tube and a dropping funnel, and dissolved at 80° C. After cooled to 40° C., the activated cellulose was added to it, and stirred for 1 hour. This was cooled to room temperature, and 93 g of acetic acid (Wako Pure Chemical), 38 g of benzoic acid (Wako Pure Chemical), 380 g of dicyclohexylcarbodiimide (Wako Pure Chemical), 130 g of 4-dimethylaminopyridine (Wako Pure Chemical), and 130 g of dimethylaminopyridinium p-toluenesulfonate (Tokyo Kasei) were added to it, and stirred for 24 hours. After the reaction, this was left cooled to room temperature, and the reaction solution was poured into 5 L of water with vigorously stirring, whereby a white solid deposited. The white solid was taken out through suction filtration, and washed three times with a large quantity of methanol. The obtained white solid was dried overnight at 60° C., and then dried in vacuum at 90° C. for 6 hours to give 90 g of the intended comparative compound B-1 as a white powder. The mean degree of polymerization of the compound was 250.

1.-23 Production Example 23

Production of Comparative Compound B-2

130 g of a comparative compound B-2 was produced in the same manner as in production of the previous intermediate compound B-1, for which, however, the amount of acetic acid was changed from 93 g to 89 g, the amount of benzoic acid was changed from 38 g to 226 g, and the amount of dicyclohexylcarbodiimide (Wako Pure Chemical) was changed from 380 g of 420 g. The mean degree of polymerization of the compound was 250.

2. Examples

2.-1 Example 1

Formation of Cellulose Acylate Film

Using the cellulose acylate shown in the following Table, cellulose acylate films were produced according to the method mentioned below.

2.-1-1 Preparation of Cellulose Acylate Solution

The following materials were put into a mixing tank, and stirred under heat and dissolved to prepare a cellulose acylate-containing solution.

| | |
|---|---|
| Cellulose acylate shown in Table below | 100 mas. pts. |
| Methylene chloride (first solvent) | 402 mas. pts. |
| Methanol (second solvent) | 60 mas. pts. |

2.-1-2 Formation of Cellulose Acylate Film Sample 562 parts by mass of the cellulose acylate-containing solution was cast, using a band caster. The film having a residual solvent content of 15% by mass was monoaxially stretched in the transverse direction at a stretching ratio of from 1 to 4%, using a tenter at 140° C., so that the film could have Re=0, thereby producing the cellulose acylate film shown in the following Table. Unless otherwise specifically indicated in the following description, the thickness of the film produced was all 80 μm.

2.-1-3 Evaluation of Cellulose Acylate Film Sample

The film sample was evaluated as follows: A part (120 mm×120 mm) of each film sample obtained in the above was prepared, and its retardation was measured. Using "KOBRA 21ADH" (by Oji Scientific Instruments), Rth of the sample piece at a wavelength of 590 nm was measured at 25° C. and 60% RH. The results are shown in the following Table.

In addition, the difference between Rth at a wavelength of 590 nm and at 25° C. and 80% RH, and Rth at a wavelength of 590 nm and at 25° C. and 10% RH, ΔRth was determined. The results are shown in the following Table.

From the results shown in the above Table, it is understandable that the cellulose acylate films (SA-1 to 12) of Examples of the invention have a negative Rth of which the absolute value is large. On the other hand, cellulose acylate having Substitution A, of which, however, the value "DSA2+DSA3−DSA6" falls without the scope of the invention, or that is, the value does not satisfy the above relational expression (I), was used to produce the films of Comparative Examples (SB-1 and SB-2), and these comparative films had a positive Rth.

When cellulose acylate, of which the total degree of substitution, DS, satisfies the above relational expression (III), is used and when the case is compared with a case of using cellulose acylate not satisfying it, it is understood that in the former case, ΔRth of the film, or that is, the humidity dependence of Rth of the film is reduced.

2.-2 Example 2

Construction of IPS-Mode Liquid-Crystal Display Device

2.-2-1 Formation of Laminate Film

An optically-anisotropic layer was formed on the surface of the above films Nos. SA-1 to SA-13, according to the method mentioned below, thereby producing laminate films Nos. LSA-1 to LSA-13.

2.-2-2 Formation of Alignment Layer

The surface of each film was saponified, and while the film was conveyed, an alignment film-coating liquid having the formulation mentioned below was applied onto the film in an amount of 20 mL/m$^2$, using a wire bar coater. This was dried with hot air at 60° C. for 60 seconds and with hot air at 100° C. for 120 seconds, thereby forming a film. Next, the formed

TABLE 4

| Film No. | Cellulose Acylate No. | Substitution A | (II) *1 | (I) *2 | DSA2 + DSA3 | DSA6 | DS | Rth (nm) | ΔRth (nm) | Note *3 |
|---|---|---|---|---|---|---|---|---|---|---|
| SA-1 | A-1 | benzoyl | 0.65 | 0.65 | 0.65 | 0 | 3.0 | −295 | 19 | I |
| SA-2 | A-3 | Benzoyl | 0.49 | 0.35 | 0.42 | 0.07 | 3.0 | −222 | 21 | I |
| SA-3 | A-5 | Benzoyl | 0.49 | 0.35 | 0.42 | 0.07 | 2.91 | −211 | 25 | I |
| SA-4 | A-6 | 4-heptyl benzoyl | 0.49 | 0.35 | 0.42 | 0.07 | 3.0 | −267 | 11 | I |
| SA-5 | A-9 | 4-heptyloxy benzoyl | 0.49 | 0.35 | 0.42 | 0.07 | 3.0 | −278 | 13 | I |
| SA-6 | A-12 | 4-hexyl benzoyl | 0.49 | 0.35 | 0.42 | 0.07 | 3.0 | −254 | 13 | I |
| SA-7 | A-15 | 4-hexyloxy benzoyl | 0.49 | 0.35 | 0.42 | 0.07 | 3.0 | −259 | 15 | I |
| SA-8 | A-18 | 2,4,5-trimethoxy benzoyl | 0.49 | 0.35 | 0.42 | 0.07 | 3.0 | −235 | 22 | I |
| SA-9 | A-21 | 3,4,5-trimethoxy benzoyl | 0.49 | 0.35 | 0.42 | 0.07 | 3.0 | −233 | 22 | I |
| SA-10 | A-29 | Benzoyl | 0.39 | 0.37 | 0.38 | 0.01 | 3.0 | −180 | 20 | I |
| SA-11 | A-30 | Benzoyl | 0.32 | 0.25 | 0.29 | 0.03 | 3.0 | −155 | 22 | I |
| SA-12 | A-54 | Benzoyl | 0.55 | 0.11 | 0.33 | 0.22 | 3.00 | −150 | 19 | I |
| SA-13 | A-55 | Benzoyl | 0.50 | 0.06 | 0.28 | 0.22 | 2.91 | −120 | 23 | I |
| SB-1 | B-1 | Benzoyl | 0.3 | −0.25 | 0.02 | 0.27 | 2.6 | 118 | 31 | C |
| SB-2 | B-2 | Benzoyl | 0.7 | −0.48 | 0.11 | 0.59 | 2.9 | 192 | 24 | C |

*1: Value "DSA2 + DSA3 + DSA6" of Substitution A in Cellulose Acylate
*2: Value "DSA2 + DSA3 − DSA6" of Substituent A in Cellulose Acylate
*3: "I" indicates an examples of the invention; and "C" indicates a comparative example.

film was rubbed in the direction parallel to the machine direction of the film, thereby forming an alignment layer.

Formulation of Alignment Film-Coating Liquid:

| | |
|---|---|
| Modified polyvinyl alcohol mentioned below | 10 mas. pts. |
| Water | 371 mas. pts. |
| Methanol | 119 mas. pts. |
| Glutaraldehyde | 0.5 mas. pts. |

Modified Polyvinyl Alcohol:

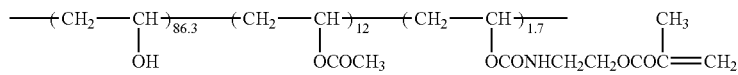

2.-2-3 Formation of Optically Anisotropic Layer

A coating liquid having the following formulation was continuously applied onto the alignment layer, using a bar coater. The coating layer was heated at 100° C. for 1 minute thereby aligning rod-shaped liquid-crystal molecules, and then irradiated with UV rays to polymerize the rod-shaped liquid-crystal molecules, and the alignment state was fixed as such thereby forming an optically-anisotropic layer.

Formulation of Coating Liquid for Formation of Optically-Anisotropic Layer:

| | |
|---|---|
| Rod-shaped liquid-crystal compound mentioned below | 38.4 mas. % |
| Sensitizer mentioned below | 0.38 mas. % |
| Photopolymerization initiator mentioned below | 1.15 mas. % |
| Air Interface Horizontally-Aligning Agent mentioned below | 0.06 mas. % |
| Methyl ethyl ketone | 60.0 mas. % |

Rod-Shaped Liquid-Crystal Compound:

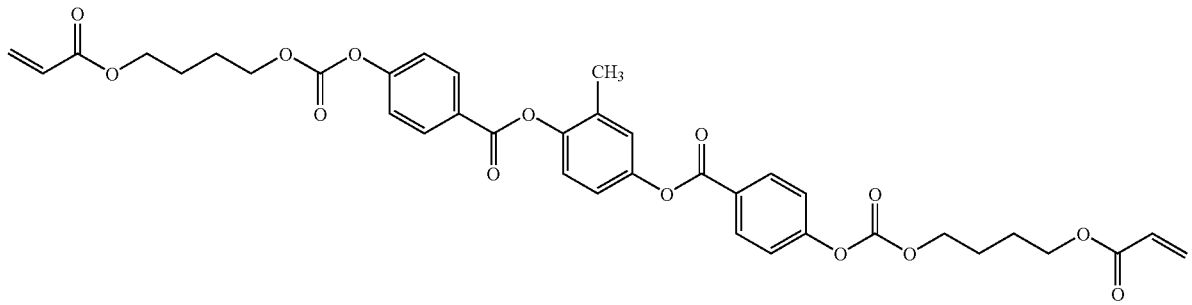 [SMILES: C=CC(=O)OCCCCOC(=O)Oc1ccc(C(=O)Oc2ccc(OC(=O)c3ccc(OC(=O)OCCCCOC(=O)C=C)cc3)c(C)c2)cc1]

Sensitizer:

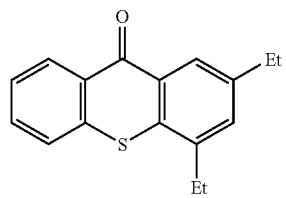 [SMILES: CCc1cc(CC)c2sc3ccccc3c(=O)c2c1]

Photopolymerization Initiator:

Air Interface Horizontally-Aligning Agent:

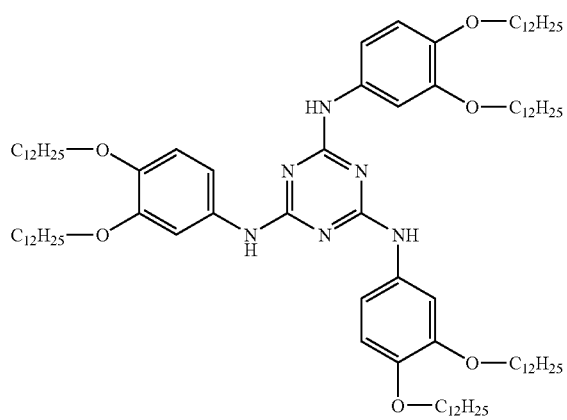

Using an automatic birefringence meter (KOBRA-21 ADH, by Oji Scientific Instruments), the laminate film of the cellulose acylate film and the optically-anisotropic layer was analyzed for the light incident angle dependence of Re. The previously-measured contribution of the cellulose acylate film was subtracted from the found data, thereby computing the optical characteristics of the optically-anisotropic layer alone. Re of the optically-anisotropic layer was 137 nm, Rth thereof was 69 nm, and Nz thereof was 1.0; and the mean tilt angle to the layer plane of the major axis of rod-shaped liquid-crystal molecules was 0°, or that is, the molecules were aligned in parallel to the film surface. The rod-shaped liquid-crystal molecules were aligned in such a manner that its major axis direction could be in parallel to the machine direction of the rolled cellulose acetate film (in other words, the slow axis direction of the optically-anisotropic layer was in parallel to the machine direction of the cellulose acylate film).

In the manner as above, laminate films Nos. LSA-1 to LSA-13 were produced.

2.-2-4 Construction of IPS-Mode Liquid-Crystal Cell

As shown in FIG. 1, electrodes ("2" and "3" in FIG. 1 indicating a pixel electrode and a displaying electrode especially) were formed on a glass substrate in such a manner that the distance between the neighboring electrodes could be 20 μM, and a polyimide film serving as an alignment film was provided on it and rubbed in the direction indicated with "4" in FIG. 1. A polyimide film was provided on one surface of separately-prepared another glass substrate, and rubbed to be an alignment film. These two glass substrates were stuck together in such a manner that the alignment films could face each other, the distance (gap, d) between the substrates could be 3.9 μm, and the rubbing direction of the two glass substrates could be in anti-parallel to each other. A nematic liquid-crystal composition having a refractivity anisotropy (Δn) of 0.0769 and a positive dielectric anisotropy (ΔΣ) of 4.5 was sealed up in the cell. d·Δn of the liquid-crystal layer was 300 nm.

2.-2-5 Formation of Panel-Side Polarizing Plate

A rolled polyvinyl alcohol film having a thickness of 80 μm and continuously died in an aqueous iodine solution was unrolled and stretched by 5 times in the machine direction, and then dried to prepare a polarizing film having a length of 500 m.

As a panel-side protective film, prepared was a saponified cellulose triacetate film (FUJITAC TD80UF, by FUJIFILM).

As a liquid-crystal cell-side protective film, prepared was any of the above-produced laminate films Nos. LSA-1 to LSA-13.

FUJITAC TD80UF was stuck to one surface of the polarizing film, and the laminate film was to the other surface thereof in such a manner that the surface of the cellulose acylate film could be in contact with the polarizing film, using a polyvinyl alcohol adhesive, thereby fabricating a panel-side polarizing plate. The absorption axis of the polarizing film was parallel to the in-plane slow axis of the optically-anisotropic layer.

In that manner as above, fabricated were polarizing plates Nos. PSA-1 to PSA-13 each having any of the laminate films Nos. LSA-1 to LSA-13 as a protective film.

2.-2-6 Backlight-Side Polarizing Plate

The same polarizing film as that used in the panel-side polarizing plate was prepared.

As a panel-side protective film, prepared was a saponified cellulose triacetate film (FUJITAC TD80UF, by FUJIFILM).

As a liquid-crystal cell-side protective film, prepared was a saponified cellulose triacetate film (FUJITAC T40UZ, by FUJIFILM, having a thickness of 40 μm, and Re=1 nm and Rth=35 nm).

FUJITAC TD80UF was stuck to one surface of the polarizing film and FUJITAC T40UZ was to the other surface thereof, using a polyvinyl alcohol adhesive, thereby fabricating a backlight-side polarizing plate.

2.-2-7 Construction and Evaluation of IPS-Mode Liquid-Crystal Display Device Any of the above-produced panel-side polarizing plates Nos. PSA-1 to PSA-13 was stuck to one side of the produced IPS-mode liquid-crystal cell in such a manner that the absorption axis of the polarizing plate could be perpendicular to the rubbing direction of the liquid-crystal cell (the slow axis direction of the liquid-crystal molecules in the black state), or that is, the transmission axis thereof could be in parallel to the slow axis direction of the liquid-crystal molecules in the time black state and in such a manner that the optically-anisotropic layer could be on the side of the liquid-crystal cell. Next, to the other side of the liquid-crystal cell, the above-fabricated backlight-side polarizing plate was stuck in a cross-Nicol configuration in such a manner that the liquid-crystal cell-side protective film could be on the side of the liquid-crystal cell, thereby constructing liquid-crystal display devices Nos. 1 to 13.

The liquid-crystal display devices Nos. 1 to 13 were tested for the viewing angle characteristics, and it was found that all the devices in the black state gave no light leakage in the oblique direction, and they gave high-contrast images.

2.-3 Example 3

Construction of IPS-Mode Liquid-Crystal Display Devices

2.-3-1 Formation of Laminate Film

Laminate films were produced in the same manner as in production of panel-side polarizing plates Nos. PSA-1 to PSA-13, for which, however, the optically-anisotropic layer was not formed and in place of it, any of polymer films 1 to 5 produced in the manner mentioned below was stuck to the surface of the cellulose acylate films Nos. SA-1 to SA-13 with an adhesive.

2.-3-2 Formation of Polymer Films 1 to 3

Polycarbonate pellets were dissolved in methylene chloride, and cast onto a metal band and then dried to form a polycarbonate film having a thickness of 80 μm. The polycarbonate film was monoaxially stretched in the transverse direction by 3.5% or 4.5%, using a transverse-direction monoaxial tenter stretcher at a temperature of 170° C., thereby producing a polymer film 1 and a polymer film 2 having a length of 500 m.

The polycarbonate film having a thickness of 80 μm was further biaxially stretched in the machine direction by 3.5% and in the transverse direction by 1% at a temperature of 170° C., thereby producing a polymer film 3 having a length of 500 m.

Using an automatic birefringence meter (KOBRA-21 ADH, by Oji Scientific Instruments), the light incident angle dependence of Re of each film was measured, and the optical characteristics thereof were computed. The data were as follows:

Polymer film 1: having Re of 100 nm, Rth of 50 nm and Nz of 1.0.

Polymer film 2: having Re of 140 nm, Rth of 70 nm and Nz of 1.0.

Polymer film 3: having Re of 80 nm, Rth of 80 nm and Nz of 1.5.

The in-lane slow axis of all these long and continuous films was perpendicular to the machine direction of the films.

2.-3-3 Formation of Polymer Film 4

A commercially-available norbornene film (Zeonoa, trade name by Nippon Zeon) was stretched by 1.25 times in the transverse direction, using a transverse-direction monoaxial tenter stretcher at a temperature of 170° C., and then the clipped parts of the film were trimmed away, and this was rolled to prepare a polymer film 4. The polymer film 4 had Re of 93 nm, Rth of 133 nm and Nz of 1.9; and it was confirmed that the slow axis thereof was in parallel to the machine direction of the long and continuous film.

2.-3-4 Formation of Polymer Film 5

A commercially-available norbornene film (Arton, by JSR) was stretched by 1.27 times in the transverse direction, using a transverse-direction monoaxial tenter stretcher at a temperature of 145° C. In this case, the machine-direction tension to the film was so controlled that the film could shrink by 3% in the machine direction. After the stretching treatment, the clipped parts of the film were trimmed away, and this was rolled to prepare a polymer film 5.

The polymer film 5 had Re of 102 nm, Rth of 123 nm and Nz of 1.7; and it was confirmed that the slow axis thereof was in parallel to the machine direction of the long and continuous film.

2.-3-5 Fabrication of Panel-Side Polarizing Plate

A panel-size polarizing plate was fabricated in the same manner as in Example 2, for which, however, the above-produced laminate film was stuck to the polarizing plate as a liquid-crystal cell-side protective film. They were stuck together with an adhesive in such a manner that the face of the polymer films 1 to 5 could be on the side of the face of the polarizing film.

The absorption axis of the polarizing film was perpendicular to the in-plane slow axis of the polymer films 1 to 5.

2.-3-6 Construction of IPS-Mode Liquid-Crystal Display Device

IPS-mode liquid-crystal display devices were constructed in the same manner as in Example 2, for which, however, the above-produced panel-side polarizing plates were used in place of the panel-side polarizing plates Nos. PSA-1 to PSA-13.

The constructed liquid-crystal display devices were tested for the viewing angle characteristics, and it was known that all the devices in the black state gave no light leakage in the oblique direction, and they gave high-contrast images.

What is claimed is:

1. A cellulose acylate composition comprising at least one cellulose acylate having an aromatic group-containing acyl group (Substituent A), in which the substitution degree with Substituent A satisfies following relational expressions (I) and (II):

$$DSA2+DSA3-DSA6>0.05, \quad (I)$$

$$0.11<DSA2+DSA3+DSA6<0.71, \quad (II)$$

wherein DSA2, DSA3 and DSA6 each indicates the substitution degree with Substituent A at the 2-, 3- and 6-positions of the cellulose acylate, respectively; and the cellulose acylate satisfies following relational expression (III):

$$2.9 \leq DS \leq 3.0 \quad (III)$$

wherein DS indicates the total substitution degree of the cellulose acylate.

2. The composition of claim 1, wherein the cellulose acylate further has an aliphatic acyl group (Substituent B).

3. The composition of claim 2, wherein the substitution degree, DSB, with Substituent B satisfies the following relational expression (IV):

$$2.15 \leq DSB \leq 2.89. \quad (IV)$$

4. The composition of claim 2, wherein Substituent B is a $C_{2-4}$ aliphatic acyl group.

5. The composition of claim 4, wherein Substituent B is an acetyl group.

6. The composition of claim 1, wherein Substituent A is selected from the group consisting of a benzoyl group, a phenyl benzoyl group, a 4-heptyl benzoyl group, a 2,4,5-trimethoxy benzoyl group and a 3,4,5-trimethoxy benzoyl group.

7. A cellulose acylate film formed of a composition as set forth in claim 1, having a negative thickness-direction retardation (Rth).

8. The film of claim 7, which is a retardation film.

9. An optical compensation film comprising a cellulose acylate film as set forth in claim 7, and an optically-anisotropic layer comprising a liquid-crystal compound fixed in an alignment state.

10. An antireflection film comprising a cellulose acylate film as set forth in claim 7, and an antireflection layer.

11. A polarizing plate comprising a polarizing film and a cellulose acylate film as set forth in claim 7.

12. An image display device at least comprising a cellulose acylate film as set forth in claim 7.

13. A cellulose acylate composition comprising at least one cellulose acylate having an aromatic group-containing acyl group (Substituent A), in which the substitution degree with Substituent A satisfies the following relational expressions (I) and (II):

$$DSA2+DSA3-DSA6>0.05, \quad (I)$$

$$0.11<DSA2+DSA3+DSA6<0.71, \quad (II)$$

wherein DSA2, DSA3 and DSA6 each indicates the substitution degree with Substituent A at the 2-, 3- and 6-positions of the cellulose acylate, respectively; the cellulose acylate further has an aliphatic acyl group (Substituent B); and the substitution degree, DSB, with Substituent B satisfies the following relational expression (IV):

$$2.15 \leq DSB \leq 2.89. \quad (IV)$$

* * * * *